(12) United States Patent
Liang

(10) Patent No.: US 7,999,925 B2
(45) Date of Patent: Aug. 16, 2011

(54) OPTICAL SIGHT

(75) Inventor: Shang-Yung Liang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 190 days.

(21) Appl. No.: 12/538,914

(22) Filed: Aug. 11, 2009

(65) Prior Publication Data

US 2011/0037967 A1 Feb. 17, 2011

(51) Int. Cl.
*G01C 3/08* (2006.01)
(52) U.S. Cl. ............ 356/5.01; 356/3.01; 356/4.01; 356/5.1; 356/5.15; 359/399
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS 6,753,951 B2 * 6/2004 Fukumoto ............... 356/4.01
2007/0175081 A1 * 8/2007 Lacorte .................... 42/142
* cited by examiner

*Primary Examiner* — Thomas H. Tarcza
*Assistant Examiner* — Luke D Ratcliffe
(74) *Attorney, Agent, or Firm* — Trop, Pruner & Hu, P.C.

(57) ABSTRACT

An optical sight includes an outer barrel unit, an objective lens unit, an ocular lens unit, a magnification unit, a range-finding module, and a display unit. The objective lens and the ocular lens unit are mounted to front and rear ends of the outer barrel unit, respectively. The magnification unit is disposed between the objective lens unit and the ocular lens unit. The range-finding module is disposed on the magnification unit, and includes a light emitter, a light receiver, and a micro processing unit. The display unit is disposed in the outer barrel unit, and includes a seat mounted adjustably between the magnification unit and the ocular lens unit, and a transparent display secured to the seat and coupled electrically to the micro processing unit. The transparent display has an aiming indicator, and a message indicator for visual indication of a range calculated by the micro processing unit.

14 Claims, 11 Drawing Sheets

OPTICAL SIGHT

BACKGROUND OF THE INVENTION

1. Field of the Invention

The invention relates to an optical sight.

2. Description of the Related Art

Referring to FIGS. 1 to 3, a conventional laser optical sight is shown to include an outer barrel unit 1, an objective lens unit 2, an ocular lens unit 3, a magnification unit 4 disposed in the outer barrel unit 1 and operable to adjust magnification, an aiming unit 5 disposed at a rear end of the magnification unit 4, and a display unit 6 disposed in the outer barrel unit 1. The magnification unit 4 includes an inner barrel 401. The aiming unit 5 includes an aiming plate 501, a washer 502 disposed between the aiming plate 501 and a rear end of the inner barrel 401, and a pair of screw fasteners 503. The aiming plate 501 has a reticle 504 for aiming, and is formed with a pair of elongate holes 505. The washer 502 has a pair of through holes 506. The screw fasteners 503 are extended through the elongate holes 505 and the through holes 506 to secure the aiming plate 501 and the washer 502 to the rear end of the inner barrel 401. The display unit 6 includes a display 601. for showing a range 606 (for instance, 100 yards, as shown in FIGS. 4(c) and 4(d)), a prism 602 disposed in the inner barrel 401 and in front of the aiming unit 5, a light-collecting lens set 603 disposed between the display 601 and the prism 602, three press bolts 604 coupled threadedly to the outer barrel unit 1, and a pair of pull bolts 605 extending through the outer barrel unit 1 and coupled threadedly to the light-collecting lens set 603. The range 606 is imaged through rearward projection via the light-collecting lens set 603 and the prism 502.

With further reference to FIGS. 4(a) to 4(d), the aforementioned laser optical sight undergoes a calibration procedure for aiming precision before being delivered from a factory:

Step 1: The magnification unit 4 and the aiming unit 5 are aligned against a target chart 7 (see FIG. 4(a)) before they are disposed in the outer barrel unit 1, and a washer 502 having an appropriate thickness is selected for adjusting the position of the aiming plate 501 along a Z-axis such that the target chart 7 and the reticle 504 can be imaged clearly at the same time.

Step 2: Under different magnification ratios, the position of the aiming plate 501 on an XY-plane relative to the inner barrel 401 is adjusted so that the centers of the reticle 504 and the target chart 7 coincide (see FIG. 4(b)), followed by securing the aiming plate 501 to the inner barrel 401.

Step 3: The magnification unit 4 and the aiming unit 5 are disposed in the outer barrel unit 1, and the range 606 is displayed on the display 601. At this time, the image of the range 606 may not conform to a predetermined specified position (for example, the image of the range 606 is shown in FIG. 4(c) to be inclinedly disposed).

Step 4: The press bolts 604 and the pull bolts 605 are operated so as to adjust the front-rear and left-right inclinations of the light-collecting lens set 603 so that the image of the range 606 is adjusted to the predetermined specified position, as shown in FIG. 4(d).

Since the reticle 504 and the display 601 of the aforementioned laser optical sight are separately disposed, two different calibration mechanisms and two different calibration operations (steps 2 and 4) are needed in order to dispose the reticle 504 and the image of the range 606 at their specified positions. Moreover, the display unit 6 includes numerous components that result in a longer assembly time.

SUMMARY OF THE INVENTION

Therefore, the object of the present invention is to provide an optical sight that facilitates calibration and that has a relatively simple structure.

According to the present invention, there is provided an optical sight that comprises an outer barrel unit, an objective lens unit, an ocular lens unit, a magnification unit, a range-finding module, and a display unit. The outer barrel unit extends along an axis, and has a front end and a rear end. The objective lens unit is mounted to the front end of the outer barrel unit. The ocular lens unit is mounted to the rear end of the outer barrel unit. The magnification unit is disposed in the outer barrel unit, and is located between the objective lens unit and the ocular lens unit. The range-finding module is disposed on the magnification unit, and includes a light emitter, a light receiver, and a micro processing unit coupled electrically to the light emitter and the light receiver and operable to calculate a range. The display unit is disposed in the outer barrel unit, and includes a seat mounted adjustably between the magnification unit and the ocular lens unit, and a transparent display secured to the seat and coupled electrically to the micro processing unit. The seat has a through hole that extends along the axis and that is for passage of light. The transparent display has an aiming indicator, and a message indicator for visual indication of the range calculated by the micro processing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 5:
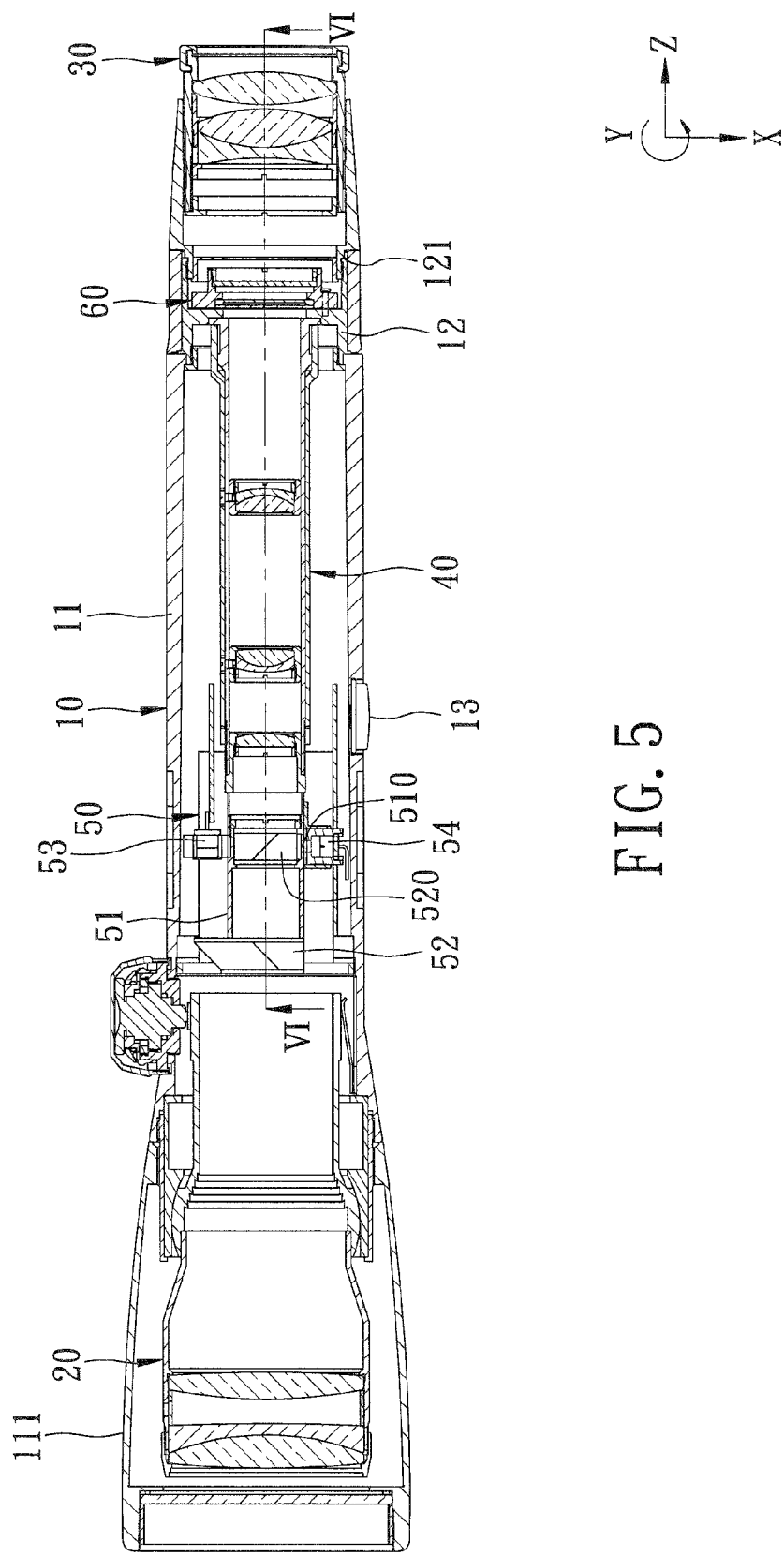
FIG. 5 is a sectional view of the preferred embodiment of an optical sight according to the present invention.
Figure 6:
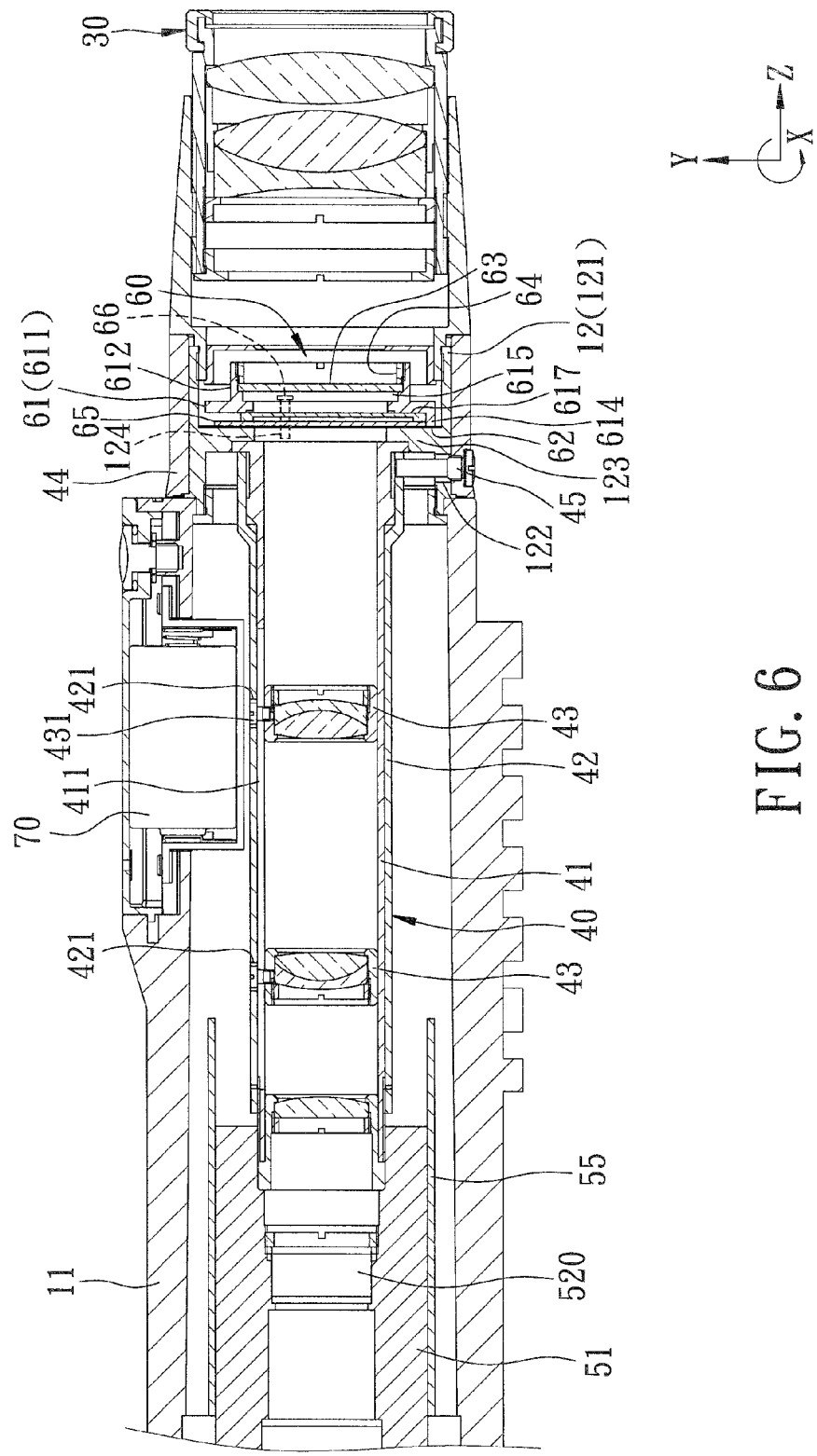
FIG. 6 is a sectional view of the preferred embodiment taken along line VI-VI in FIG. 5.
Figure 7:
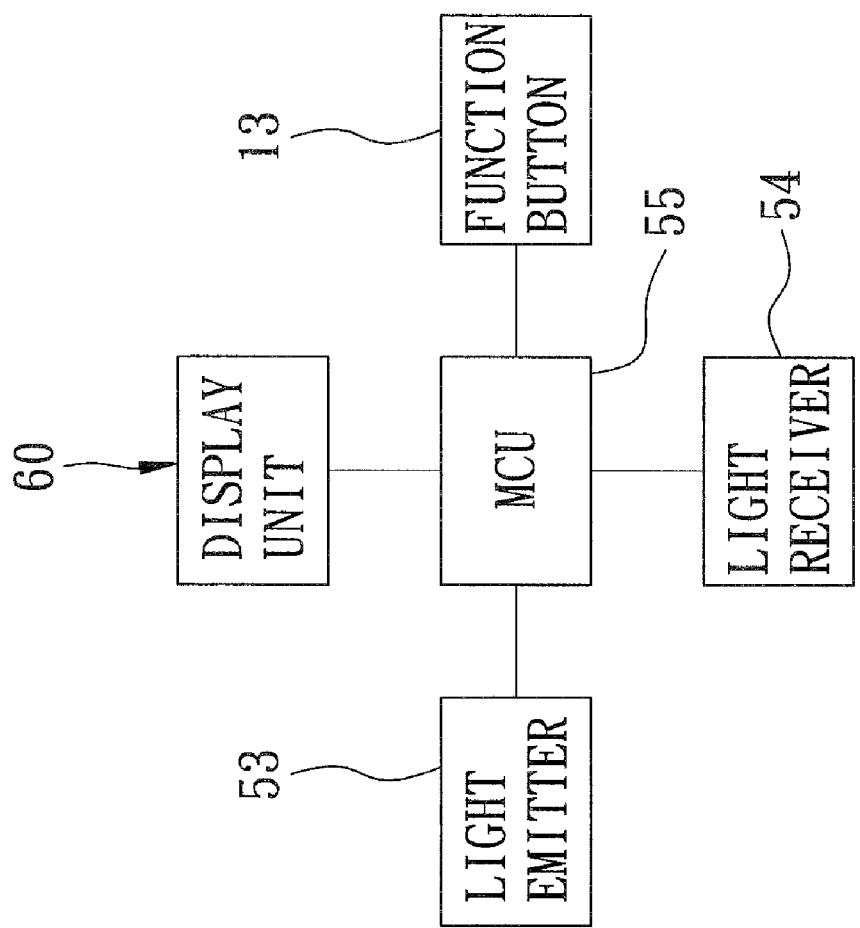
FIG. 7 is a circuit block diagram of the preferred embodiment.

Referring to FIGS. 5 to 7, the preferred embodiment of an optical sight according to the present invention is shown to include an outer barrel unit 10, an objective lens unit 20, an ocular lens unit 30, a magnification unit 40, a range-finding module 50, a display unit 60, and a battery unit 70.

Figure 8:
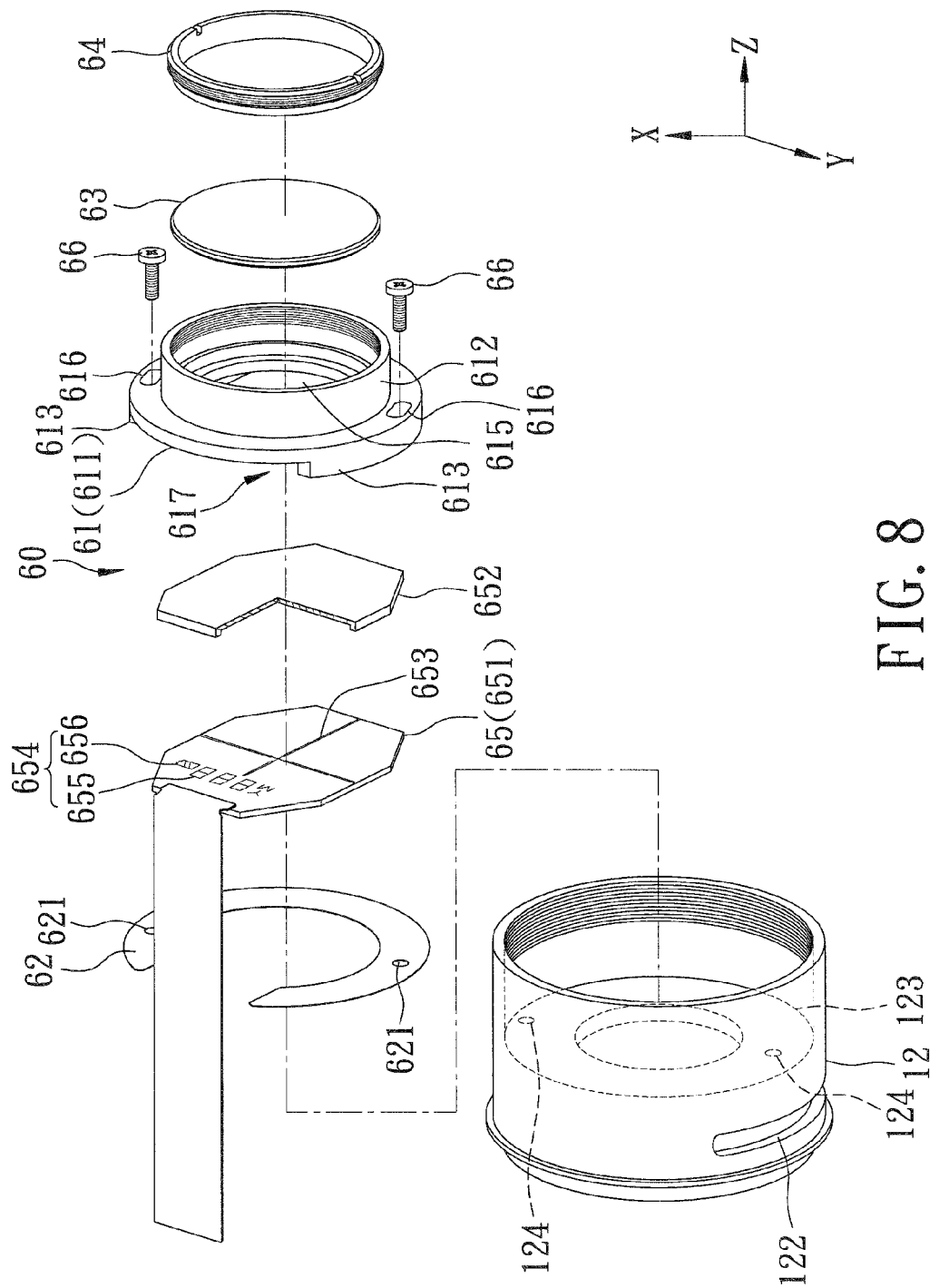
FIG. 8 is an exploded perspective view of a display unit of the preferred embodiment.

The outer barrel unit 10 extends along an axis (Z) and includes a front barrel component 11, a rear barrel component 12 connected to the front barrel component 11, and a function button 13 disposed on the front barrel component 11. The front barrel component 11 has a front end 111. With further reference to FIG. 8, the rear barrel component 12 has a rear end 121, a circumferentially extending slot 122 surrounding the axis (Z), an inner annular shoulder part 123, and a plurality of threaded securing holes 124 disposed in the inner annular shoulder part 123.

The objective lens unit 20 is mounted to the front end 111 of the front barrel component 11, as best shown in FIG. 5.

The ocular lens unit 30 is mounted to the rear end 121 of the rear barrel component 12, as best shown in FIG. 6.

As shown in FIGS. 5 and 6, the magnification unit 40 is disposed in the outer barrel unit 10, and is located between the objective lens unit 20 and the ocular lens unit 30. The magnification unit 40 includes a first inner barrel component 41 disposed in the outer barrel unit 10, a second inner barrel component 42 sleeved on the first inner barrel component 41, a plurality of lens assemblies 43 disposed in the first inner barrel component 41 and movable along the axis (Z), a magnification adjusting ring 44 sleeved on the outer barrel unit 10, and an adjusting pin 45 disposed on the magnification adjusting ring 44. The first inner barrel component 41 is fixed to the rear barrel component 12 and has a guide slot 411. The second inner barrel component 42 has a plurality of cam slots 421 that respectively correspond to the lens assemblies 43. Each of the lens assemblies 43 has a guide pin 431 that extends through the guide slot 411 and into the respective one of the cam slots 421. The adjusting pin 45 extends through the circumferentially extending slot 122 to connect to the second inner barrel component 42. The magnification adjusting ring 44 is rotatable for adjusting a magnification factor.

Figure 10B:
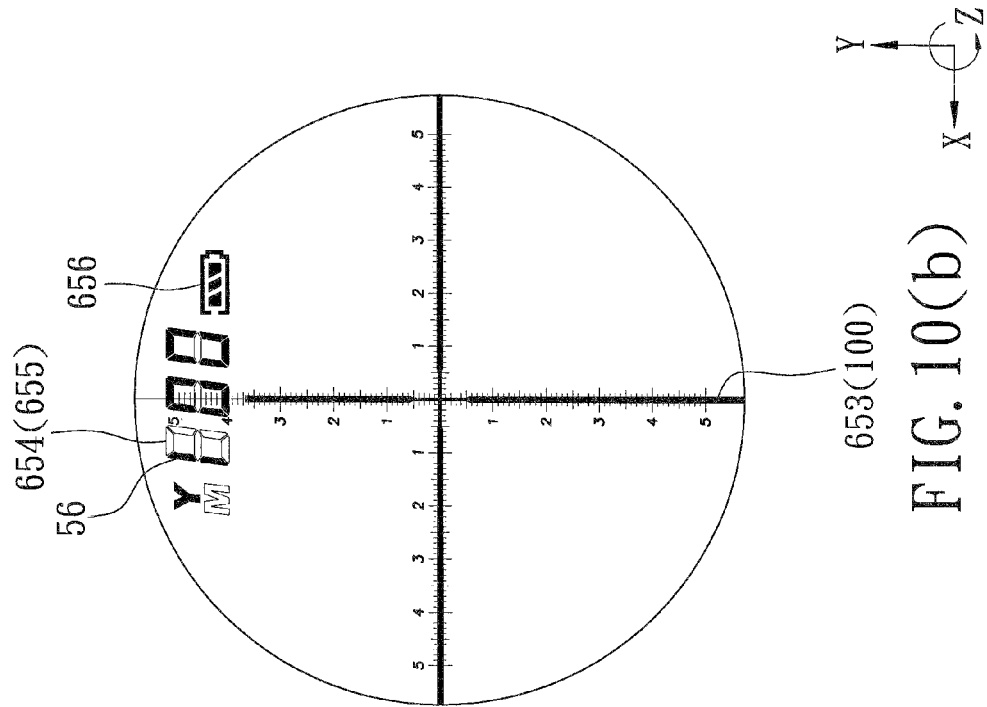
FIGS. 10(a) and 10(b) illustrate consecutive steps of a calibration procedure for the preferred embodiment.
Figure 10A:
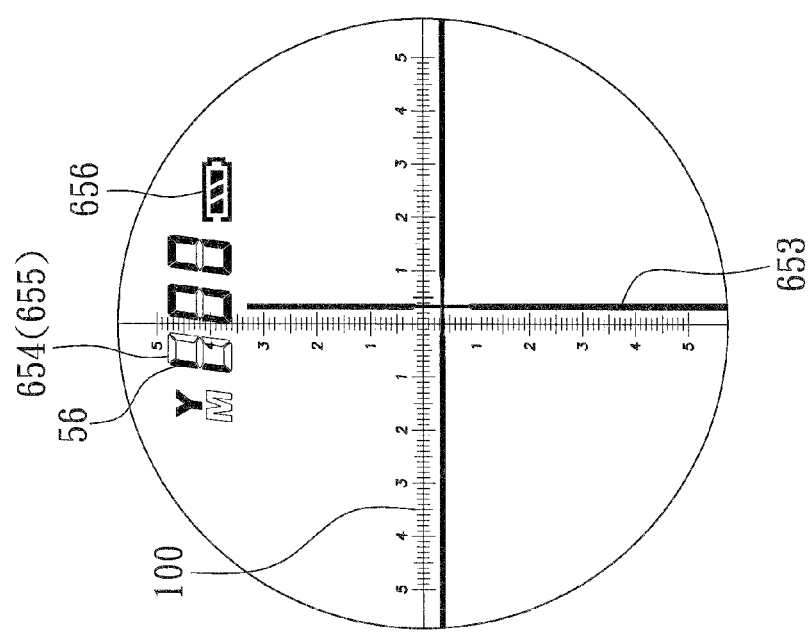

As shown in FIGS. 5 to 7, the range-finding module 50 includes a mounting barrel component 51 disposed at a front end of the first inner barrel component 41, a first prism 52 disposed at a front end of the mounting barrel component 51, a second prism 520 disposed in the mounting barrel component 51, a light emitter 53 disposed on an outer barrel surface of the mounting barrel component 51, a light receiver 54 disposed on the outer barrel surface of the mounting barrel component 51, and a micro processing unit (MCU) 55 disposed on the outer barrel surface of the mounting barrel component 51, coupled electrically to the function button 3, the light emitter 53 and the light receiver 54, and operable to calculate a range 56 (for instance, 100 yards, as shown in FIGS. 10(a) and 10(b) The mounting barrel component 51 is formed with an orifice 510 that is registered with the second prism 520 and the light receiver 54. In this embodiment, the light emitter 53 is a laser diode, and the light receiver 54 is an avalanche photodiode. The light emitter 53 emits light directed to a target (not shown) through reflection by the first prism 52. Light reflected by the target passes through the first prism 52 and is reflected by the second prism 520 to reach the light receiver 54 via the orifice 510. The micro processing unit 55 calculates the range 56 (see FIGS. 10(a) and 10(b)) as a function of the time difference between light transmission and light reception and the speed of light.

Figure 9:
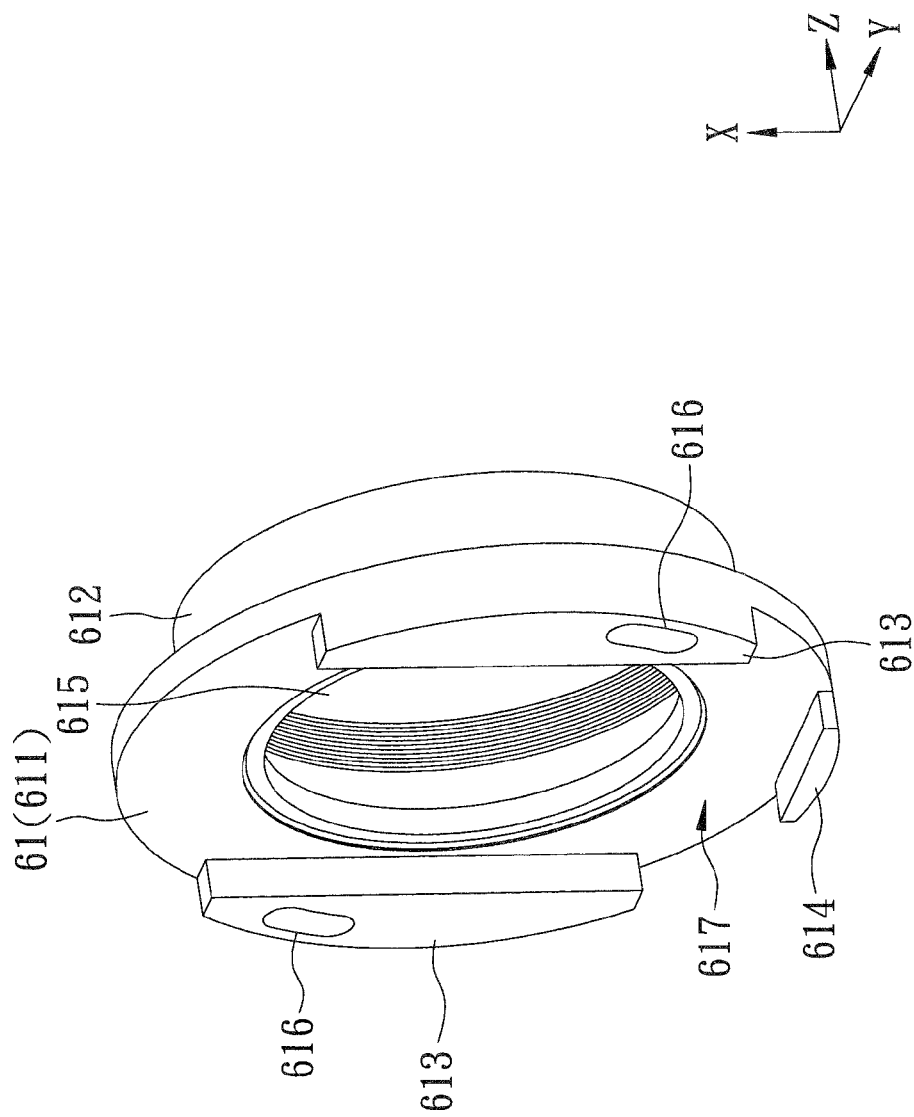
FIG. 9 is a perspective view of a seat of the display unit.

As shown in FIGS. 6, 8 and 9, the display unit 60 is disposed in the outer barrel unit 10, and includes a seat 61 mounted adjustably in the rear barrel component 12, a washer 62 disposed between the inner annular shoulder part 123 of the rear barrel component 12 and the seat 61, a dust-proofing lens 63, a press ring 64, a transparent display 65 secured to the seat 61 and coupled electrically to the micro processing unit 55, and a plurality of screw fasteners 66.

The seat 61 includes a base wall 611, a surrounding wall 612 that extends rearwardly from a rear end face of the base wall 611, left and right first limit blocks 613 that are disposed on a front end face of the base wall 611 and that are spaced apart from each other, and a second limit block 614 that is disposed on the front end face of the base wall 611 and that is located between the first limit blocks 613. The seat 61 has a through hole 615 that extends along the axis (Z) through the base wall 611, that is surrounded by the surrounding wall 612, and that is for passage of light. The seat 61 further has a plurality of elongate adjusting holes 616, each of which corresponds to a respective one of the threaded securing holes 124 and extends through the base wall 611 and a corresponding one of the first limit blocks 613. The first limit blocks 613, the second limit block 614 and the base wall 611 cooperate to define an installation recess 617 that is in spatial communication with the through hole 615.

The washer 62 has a plurality of holes 621, each of which is registered with a respective one of the threaded securing holes 124.

The lens 63 and the press ring 64 are disposed in the surrounding wall 612, respectively, and the press ring 64 presses against the lens 63.

The transparent display 65 is secured in the installation recess 617, such as by means of an adhesive, and includes a base plate 651, a shielding plate 652 disposed on a rear end face of the base plate 651, an aiming indicator 653 disposed on the rear end face of the base plate 651, and a message indicator 654 disposed on the rear end face of the base plate 651. The message indicator 654 has a range-indicating region 655 for visual indication of the range 56 (see FIGS. 10(a) and 10(b)), and a power-indicating region 656 for visual indication of residual power of the battery unit 70.

In this embodiment, the transparent display 65 is an organic light emitting diode display, and the aiming indicator 653 is a reticle etched in the rear end face of the base plate 651.

Each of the screw fasteners 66 extends through a respective one of the elongate adjusting holes 616 and a respective one of the holes 621 in the washer 62, and engages threadedly a respective one of the threaded securing holes 124 to secure the seat 61 on the rear barrel component 12.

The battery unit 70 is installed in the front barrel component 11 of the outer barrel unit 10, and is coupled to and supplies electric power to the light emitter 53, the light receiver 54 and the micro processing unit 55 of the range-finding module 50, and to the transparent display 65.

With reference to FIGS. 6, 8, 10(a) and 10(b), the optical sight of this invention undergoes a calibration procedure for aiming precision before being delivered from a factory:

Step 1: The aiming indicator 653 is aligned with a target chart 100, and a washer 62 having an appropriate thickness is selected to be disposed between the rear barrel component 12 and the seat 61 for adjusting the position of the transparent display 65 along the axis (Z) such that the target chart 100, the aiming indicator 653 and the message indicator 654 can be clearly imaged at the same time, and the resulting parallax is 0. It should be noted herein that the target chart 100 may be a physical target chart spaced apart from the optical sight of this invention by a predetermined distance, or a target chart image simulated using a collimator (not shown).

Step 2: Under different magnification ratios, the position of the seat 61 on an XY-plane relative to the rear barrel component 12 is adjusted so that the centers of the aiming indicator 653 and the target chart 100 coincide, followed by securing the seat 61 on the rear barrel component 12 using the screw fasteners 66. At this time, the message indicator 654 is also disposed at the predetermined specified position thereof.

The following are some of the advantages of the optical sight according to this invention:

1. Since the aiming indicator 653 and the message indicator 654 are both disposed on the transparent display 65, only one calibration operation (step 2) is needed to dispose the aiming indicator 653 and the message indicator 654 at their predetermined specified positions. The calibration procedure for the optical sight of this invention is thus simpler compared to that of the conventional laser optical sight.

Figure 1:
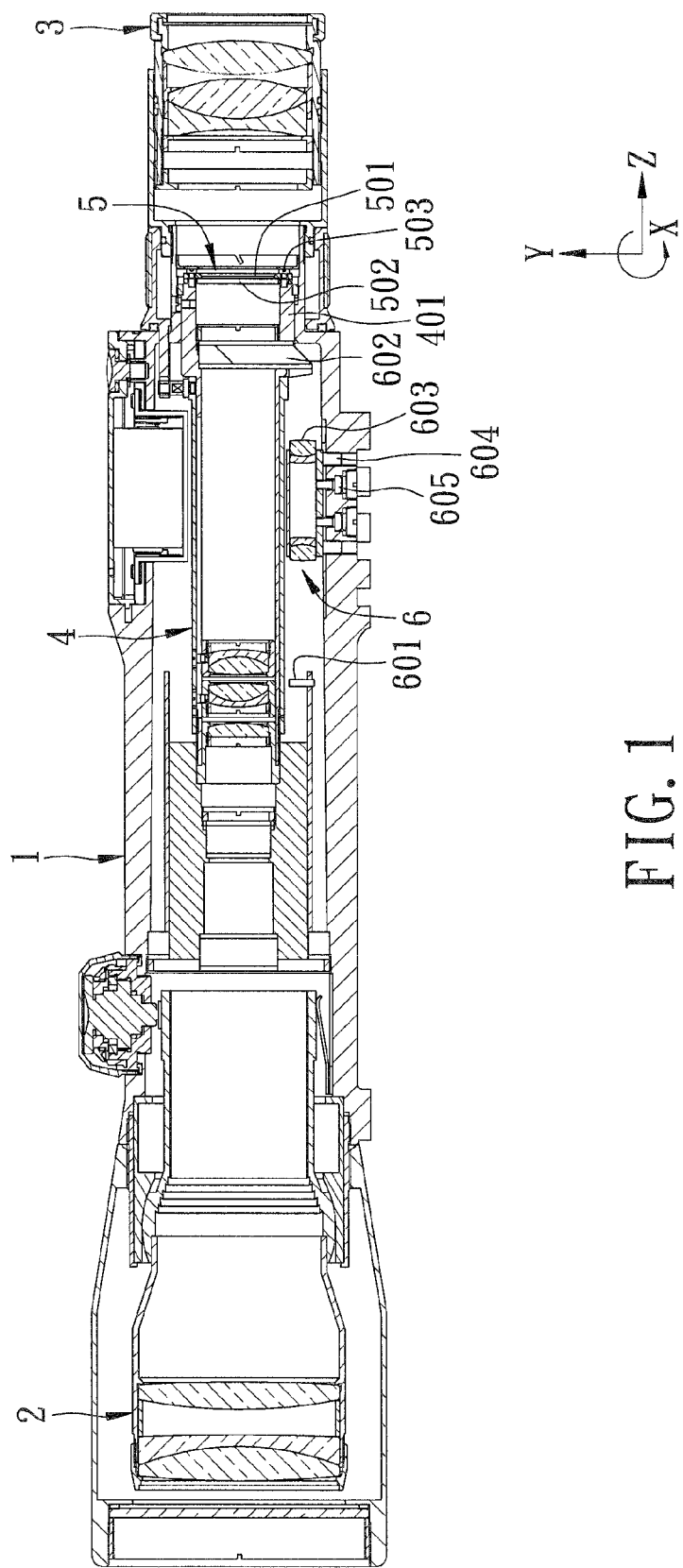
FIG. 1 is a sectional view of a conventional laser optical sight.
Figure 2:
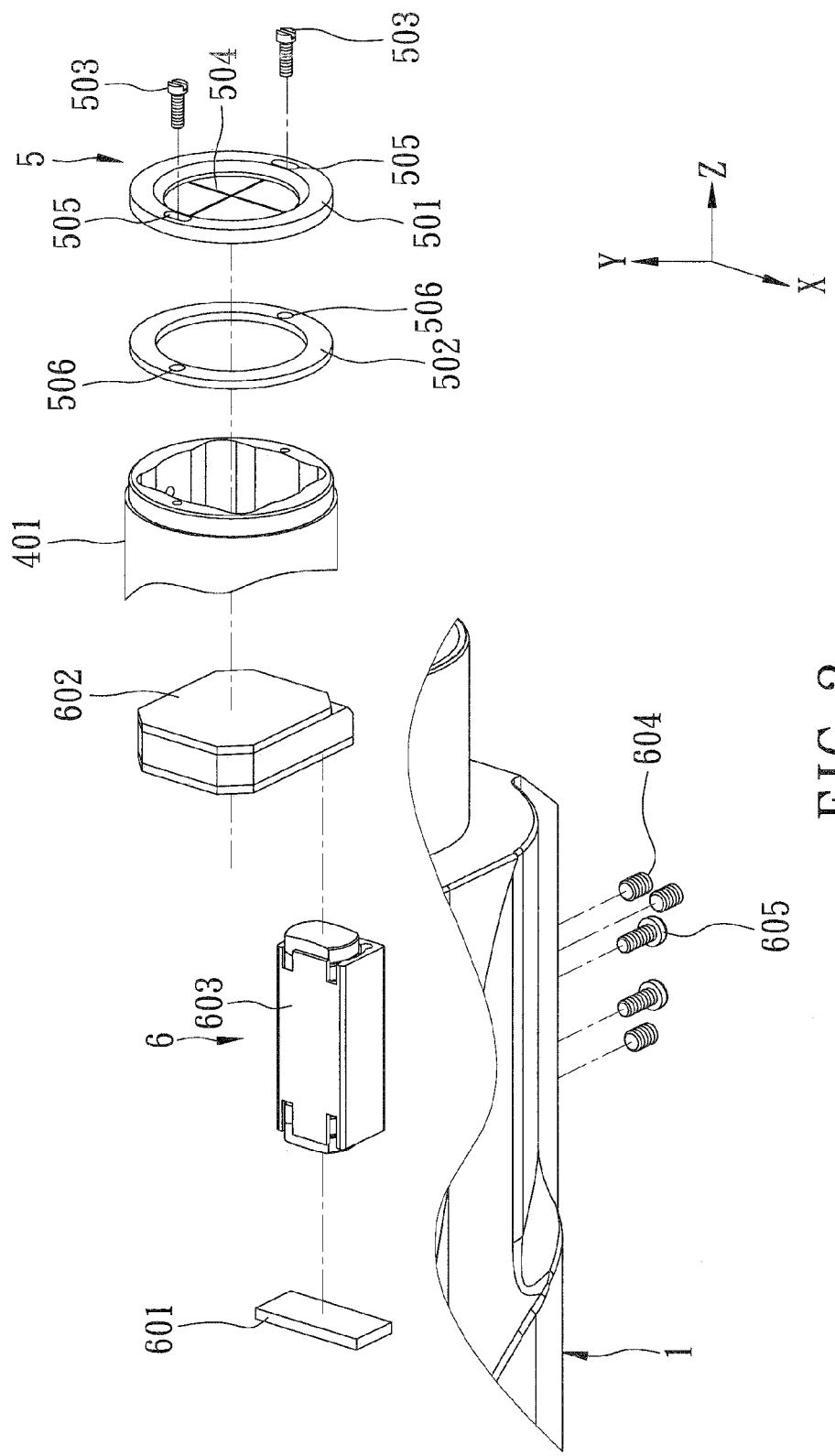
FIG. 2 is a fragmentary exploded perspective view of the conventional laser optical sight.
Figure 3:
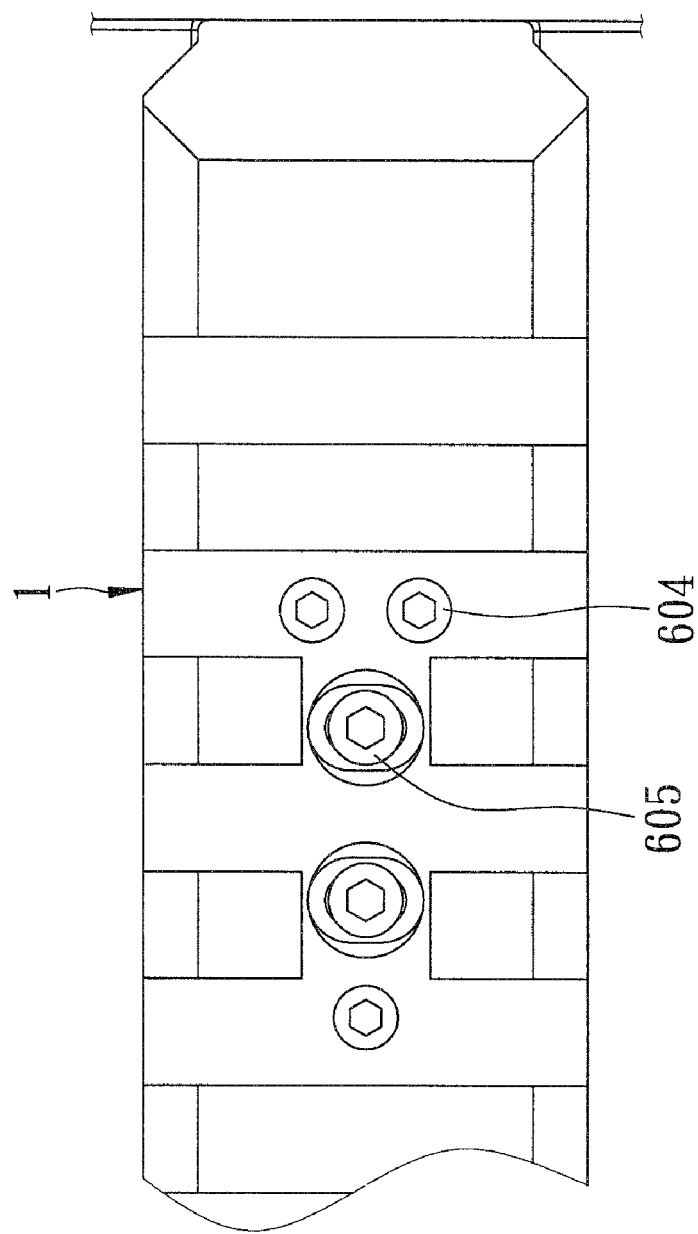
FIG. 3 is a fragmentary bottom view of the conventional laser optical sight.
Figure 4A:
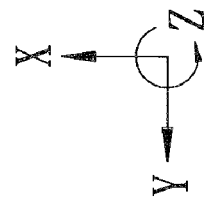
FIGS. 4(a) to 4(d) illustrate consecutive steps of a calibration procedure for the conventional laser optical sight.
Figure 4A:
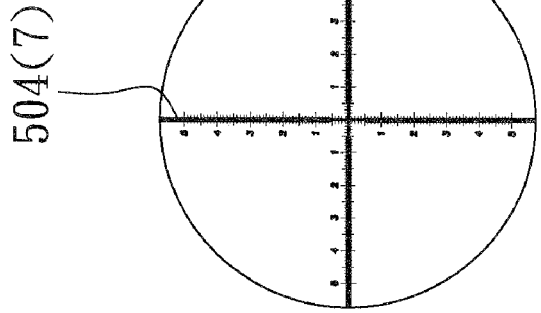
Figure 4B:
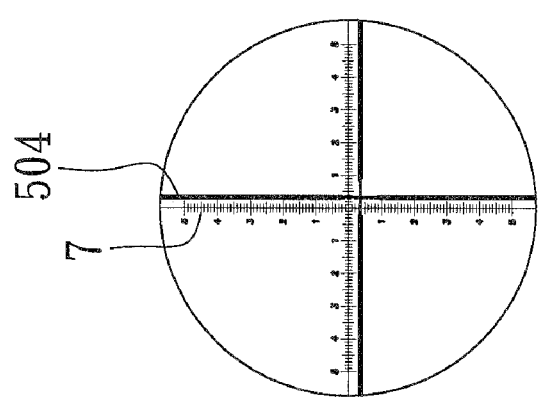
Figure 4D:
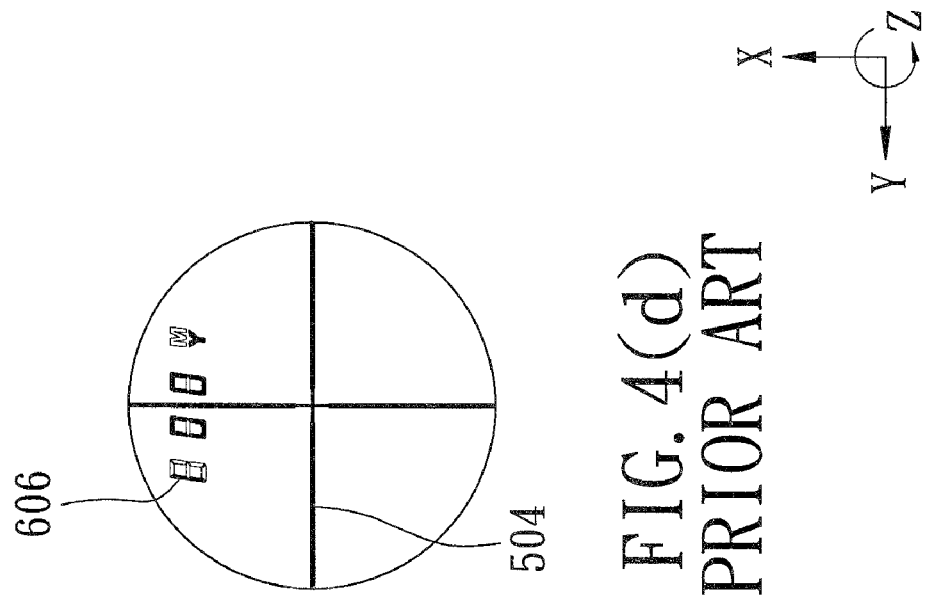
Figure 4C:
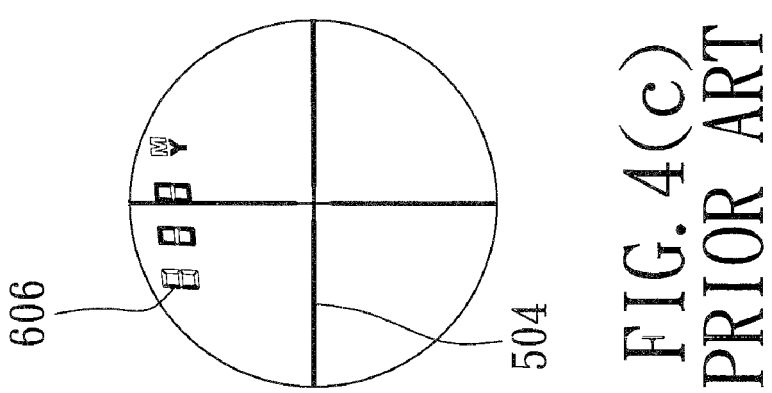

2. The optical sight of this invention omits the prism 602, the light-collecting lens set 603, the press bolts 604 and the pull bolts 605 of the conventional laser optical sight shown in FIGS. 1 to 3. Hence, the structure of the optical sight of this invention is simplified, and the manufacturing cost thereof can be reduced accordingly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical sight comprising:
    an outer barrel unit extending along an axis and having a front end and a rear end;
    an objective lens unit mounted to said front end of said outer barrel unit;
    an ocular lens unit mounted to said rear end of said outer barrel unit;
    a magnification unit disposed in said outer barrel unit and located between said objective lens unit and said ocular lens unit;
    a range-finding module disposed on said magnification unit, said range-finding module including a light emitter, a light receiver, and a micro processing unit coupled electrically to said light emitter and said light receiver and operable to calculate a range; and
    a display unit disposed in said outer barrel unit, said display unit including a seat mounted adjustably between said magnification unit and said ocular lens unit, and a transparent display secured to said seat and coupled electrically to said micro processing unit, said seat having a through hole that extends along the axis and that is for passage of light, said transparent display having an aiming indicator, and a message indicator for visual indication of the range calculated by said micro processing unit.

2. The optical sight as claimed in claim 1, wherein said outer barrel unit includes a front barrel component and a rear barrel component connected to said front barrel component, said seat being mounted adjustably in said rear barrel component.

3. The optical sight as claimed in claim 2, wherein said display unit further includes a plurality of screw fasteners, said rear barrel component having an inner annular shoulder part and a plurality of threaded securing holes disposed in said inner annular shoulder part, said seat further having a plurality of elongate adjusting holes, each of which corresponds to a respective one of said threaded securing holes, each of said screw fasteners extending through a respective one of said elongate adjusting holes and engaging threadedly a respective one of said threaded securing holes to secure said seat on said rear barrel component.

4. The optical sight as claimed in claim 3, wherein:
    said seat includes a base wall, a surrounding wall that extends rearwardly from a rear end face of said base wall, left and right first limit blocks that are disposed on a front end face of said base wall and that are spaced apart from each other, and a second limit block that is disposed on said front end face of said base wall and that is located between said first limit blocks,
    each of said elongate adjusting holes extending through said base wall and a corresponding one of said first limit blocks,
    said through hole extending along the axis through said base wall and being surrounded by said surrounding wall,
    said first limit blocks, said second limit block and said base wall cooperating to define an installation recess that is in spatial communication with said through hole,
    said transparent display being secured in said installation recess.

5. The optical sight as claimed in claim 4, wherein said display unit further includes a lens that is disposed in said surrounding wall, and a press ring that is disposed in said surrounding wall and that presses against said lens.

6. The optical sight as claimed in claim 3, wherein said display unit further includes a washer disposed between said inner annular shoulder part of said rear barrel component and said seat, said washer having a plurality of holes that permit said screw fasteners to extend therethrough, respectively.

7. The optical sight as claimed in claim 1, wherein said transparent display includes a base plate, and a shielding plate disposed on a rear end face of said base plate, said aiming indicator and said message indicator being disposed on said rear end face of said base plate.

8. The optical sight as claimed in claim 7, wherein said aiming indicator is a reticle etched in said rear end face of said base plate.

9. The optical sight as claimed in claim 8, wherein said transparent display is an organic light emitting diode display.

10. The optical sight as claimed in claim 9, further comprising a battery unit installed in said outer barrel unit, said battery unit being coupled to and supplying electric power to said range-finding module and said transparent display, said message indicator having a range-indicating region for visual indication of the range, and a power-indicating region for visual indication of residual power of said battery unit.

11. The optical sight as claimed in claim 1, wherein said outer barrel unit has a circumferentially extending slot that surrounds the axis, said magnification unit including a first inner barrel component disposed in said outer barrel unit, a second inner barrel component sleeved on said first inner barrel component, a plurality of lens assemblies disposed in said first inner barrel component and movable along the axis, a magnification adjusting ring sleeved on said outer barrel unit, and an adjusting pin disposed on said magnification adjusting ring, said adjusting pin extending through said circumferentially extending slot to connect to said second inner barrel component.

12. The optical sight as claimed in claim 11, wherein said first inner barrel component has a guide slot, said second inner barrel component having a plurality of cam slots that respectively correspond to said lens assemblies, each of said lens assemblies having a guide pin that extends through said guide slot and into the respective one of said cam slots.

13. The optical sight as claimed in claim 11, wherein said range-finding module further includes a mounting barrel component disposed at a front end of said first inner barrel component, a first prism disposed at a front end of said mounting barrel component, and a second prism disposed in said mounting barrel component,
    each of said light emitter, said light receiver, and said micro processing unit being disposed on an outer barrel surface of said mounting barrel component,
    said mounting barrel component being formed with an orifice that is registered with said second prism and said light receiver, said light emitter emitting light directed to a target through reflection by said first prism, light reflected by the target passing through said first prism and being reflected by said second prism to reach said light receiver via said orifice.

14. The optical sight as claimed in claim 13, wherein said light emitter is a laser diode, and said light receiver is an avalanche photodiode.

* * * * *